Aug. 9, 1966     L. R. RISSLER     3,265,157
FLOOR STRUCTURES FOR STORAGE DISTRIBUTION AREAS
Filed Aug. 6, 1964

INVENTOR
Lennius R. Rissler
BY *C. L. Freedman*
ATTORNEY

3,265,157
FLOOR STRUCTURES FOR STORAGE DISTRIBUTION AREAS

Lennius R. Rissler, Newark, N.J., assignor to Westinghouse Electric Corporation, Pittsburgh, Pa., a corporation of Pennsylvania
Filed Aug. 6, 1964, Ser. No. 387,976
2 Claims. (Cl. 186—1)

This invention relates to floor structures for storage distribution areas where goods are to be moved about in wheeled carriers; a familiar example of such storage areas being the serving floor of supermarkets where customers fill shopping carts from store shelves and move the carts past cashier's counters where the carts are unloaded and the goods delivered to the customers for removal. The present invention is an arrangement of floor and cart structure for limiting the floor area which the cart may traverse to certain predetermined regions to make unauthorized removal of the cart from the premises of the store impossible.

Briefly stated, the invention consists in providing thresholds having grooves for receiving the rims of the wheels of shopping carts at doors or any other boundaries beyond which it is desired to prevent progress of the cart. On the floor area which it is desired that the carts be free to traverse, the wheels run on a smooth floor; but when the wheels meet a threshold the wheel rims enter the grooves in the threshold. At the side of one or more of the wheels a brake-shoe, proportioned to strike the top of the projections on the threshold and make frictional engagement therewith, brings the cart to a halt and stops its further progress.

It is therefore, an object of the invention to provide an arrangement of the floor structure for storage areas of the types above-described in combination with cart wheels specially adapted to cause braking action when the carts come to a threshold or other floor portion at which it is desired to stop the traverse of the cart.

It is another object of the invention to provide an arrangement of a novel type of threshold for storage areas in combination with a type of carriage having wheels with narrow or grooved rims and automatic brakes which stop the progress of the carriage when the threshold is reached.

Where desired, the wheel form and brake used on the carts may be of a type described in Clyde M. Mullis and Larry P. Tosato, patent application, Serial No. 244,199, filed December 12, 1962.

It is accordingly a further object of the invention to provide a floor structure for storage areas which may be used in combination with shopping carts or the like such as are described in the Mullis and Tosato patent application to limit the portions of the floor area to which the carts shall have access.

Still another object of the invention is to provide an arrangement of the wheel structure for shopping carts in supermarkets in combination with thresholds to be installed in the floors of the latter in places at which it is desired to bar further access of the shopping carts.

Other objects of the invention will be apparent from the following description taken in conjunction with the accompanying drawings, in which.

Figure 1:
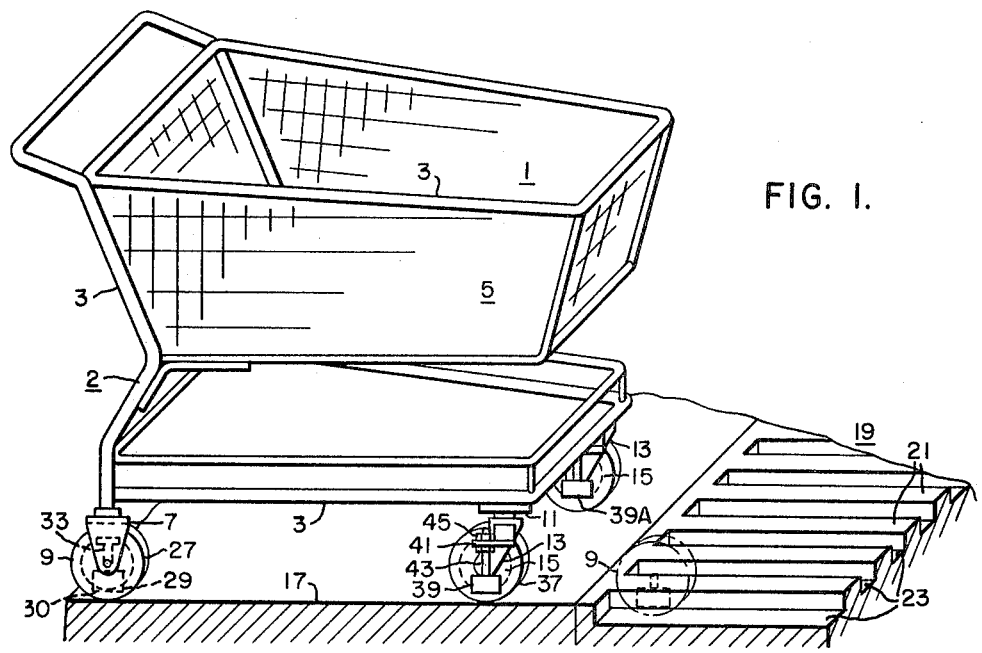
FIGURE 1 is a view in perspective of a shopping cart arranged in accordance with one form of the invention as it appears at the point on the floor of a supermarket just as it reaches a barrier threshold.

Referring to the drawing, FIG. 1 illustrates a shopping cart 1 having a frame 2 comprising frame members 3 for supporting a basket 5. Mounted to the bottom of the frame for rotation about a common axis by means of a pair of fixed U-shaped axle support members 7 are a pair of rear wheels 9. A front plate 11 secured to the bottom of the frame 2 mounts a pair of U-shaped swivel axle support members 13 for a pair of front wheels 15, the members 13 and the wheels 15 constituting casters. The general construction of such carts is well known and it appears unnecessary to describe it further.

In FIG. 1, the cart 1 is disposed on a portion of a smooth surface 17 such as the floor of a supermarket, wherein it may be pushed along in the normal manner. At least part of the smooth surface 17 is bordered by a threshold surface 19 formed of uniform and parallel projections or cleats 21, which alternate with uniform valleys or grooves 23. The cleated surface 19 may represent, for example, an extension of the surface 17 adjacent an exit of a supermarket. For present purposes is is assumed that each groove 23 has a width slightly larger than the thickness of the wheel 9. Thus when the wheel is moved over the threshold the rim of the wheel can drop into one of the grooves 23 as shown in dotted lines in FIG. 1.

One or more of the cart wheels have associated therewith means for restraining movement of the cart relative to the cleats 21. Thus, as is shown in FIG. 1, each of the rear wheels 9, may be fabricated of a relatively hard material having suitable wearing properties such as a phenolic resin. Inwardly adjacent each of the rear wheels 9 is a pad 29. If the cleated surface 19 is metallic, the pads 29 preferably are formed of friction braking material such as rubber. Conversely, if the surface 19 is fabricated of rubber, the pads may be metallic.

Each of the brake pads 29 may be secured to the adjacent cart frame member 3, but conveniently it may be mounted on the associated wheel axle support member 7. It will be observed that each pad is so positioned that its bottom surface 30 engages a portion of the cleated surface 19 when the associated wheel intermeshes with a portion of the cleats 21 as aforesaid. Although each of the pads 29 may be configured to contact only one of the cleats 21, preferably the bottom surface of each pad is flat and is proportioned to engage a plurality of such cleats for a number of reasons such as minimizing pad wear and providing smoother operation.

In order for the brake pads 29 to achieve maximum braking efficiency, the rim of the wheel should be prevented from touching the bottom of the groove 23 within which it is located. For this purpose, each pad may be fixedly mounted in the correct position on a bracket 31 but secured to the support member 7 to provide for slight variations in the sizes of the parts and for wear and tear thereon, each pad conveniently is adjustable vertically, as by means of a threaded stud 33 and a pair of locking nuts 35.

Figure 2:
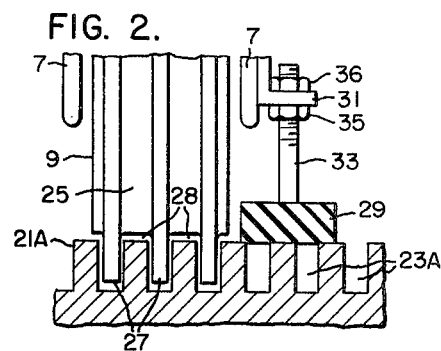
FIG. 2 is a detailed view, partly in section and to an enlarged scale, showing one of the wheels of a cart entering the threshold grooves in the floor of the supermarket with the brake making engagement with the tops of the projections thereof.

Preferably, the wheel 9 comprises a hub 25, on which is formed a plurality of peripheral cleats 27, the cleats 27 having a larger outside diameter than the hub 25 to form peripheral grooves 28 therebetween. The cleats 27 are spaced by the grooves 28 and proportioned such that they may intermesh loosely with adjacent ones of cleats 21a (FIG. 2) which correspond to the cleats 21 of FIG. 1. It will be apparent that upon occurrence of such intermesh, the cart 1 occupies a lower position than otherwise is the case, as when it is disposed on the smooth surface 17 and the outermost surfaces of the cleats 27 bear the load of the cart and its contents, if any. This facilitates the provision of narrower grooves 23A which correspond to the grooves 23 of FIG. 1

Each of the front wheels 15 is illustrated as provided with peripheral cleats 37 similar to the cleats 27 for the rear wheels 9. Preferably, front brake pads 39 similar to the rear pads 29 are mounted, as by means of brackets 41, threaded adjusting studs 43 and locking nuts 45, on the swivel axle support members 13 rather than on the adjacent cart frame member or members 3 or on the swivel support plate 11 so that the pads 39 may rotate with the casters. Otherwise, the pads 39 must be spaced from the casters sufficiently to permit rotation thereof without interference, thus taking up more space.

In order to provide balanced braking forces for the front casters when the cart is braked and thus to prevent a tendency for the casters to rotate and thereby to effect demeshing of the wheel and load carrying surface cleats, each of the casters preferably has symmetrically disposed inward and outward brake pads 39A similar to the brake pad 39 as shown in the aforesaid Mullis et al. patent application. It will be understood by inspection of the drawing and from the preceding discussion that the front brake pads operate similarly to the rear brake pads for restraining movement of the cart 1 relative to the cleated surface 19.

Figure 3:
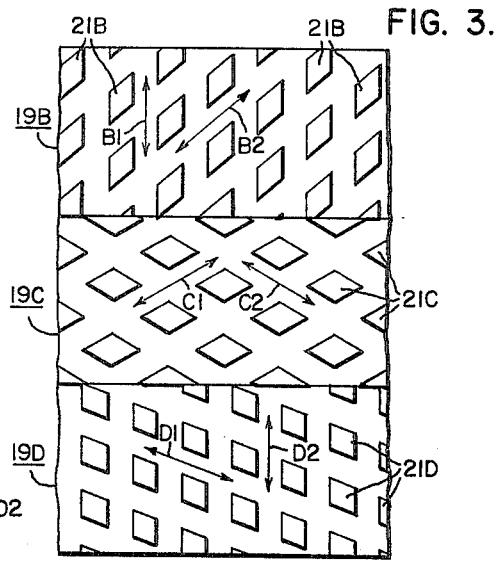
FIG. 3 is a plan view of the surface of the threshold of a type which may be used in carrying out the invention.

In FIG. 3 a threshold barrier is illustrated having three sections 19B, 19C and 19D in each of which cleats are formed by rows of projections 21B, 21C or 21D in the respective sections each projection having a cross-section which desirably is in the shape of a parallelogram. For movement of the cart in the direction of the arrows B1 and B2 for the section 19B, arrows C1 and C2 for the section 19C, and arrows D1 and D2 for the section 19C, and arrows D1 and D2 for the section 19D, at least part of the cart wheels drop into the grooves between the cleats to provide a braking action. Any number of sections having cleats running in different directions may be combined in this way to provide an effective barrier. Even if the cart is not running exactly parallel to one of the arrows part of the wheels, in particular the caster wheels, tend to drop into threshold grooves.

As shown in FIG. 3, the threshold consists of several rows of protuberances. If any attempt is made to pass the threshold with a cart through a very wide door located at the threshold by passing at an angle other than that of the cleats 21B in the upper section of FIG. 3 the casters are likely to slip into the slanting grooves of the second section of FIG. 3 or of the bottom section of that figure and the brakes will be applied as a result of the wheels slipping into these slanting grooves. In some cases the single set of grooves shown in the upper section of FIG. 3 will be found sufficient protection against traversing the threshold. In fact continous ridges or cleats between the vertical valleys or grooves as discussed for FIG. 1 can be used in some cases instead of the rows of protuberances in the upper section particularly if the cart must be moved substantially in the direction thereof.

The width of the grooves in the threshold may be made small enough so that heels on women's shoes will not enter them. For this reason, among others, it will usually, although not always, be found desirable to form the rims of the wheels as a set of parallel cleats or ridges with valleys or grooves between them as for example the three ridges shown in FIG. 2.

Figure 4:
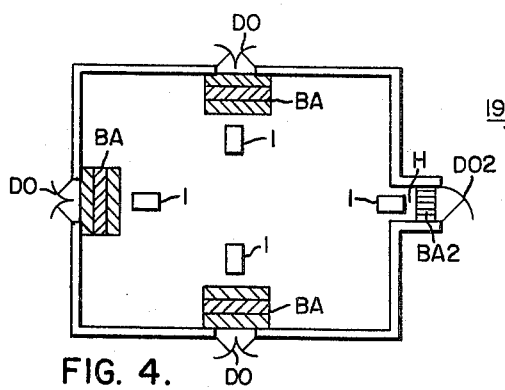
FIG. 4 is a plan view of a store area embodying the invention.

In FIG. 4 a store or floor area is disclosed which is closed by three double doors DO and by a single door DO2 which is approached through a narrow corridor H. Each of the double doors has a barrier BA in front of it comprising three sections similar to the sections 19B, 19C and 19D of FIG. 3.

The single door DO2 has a single section barrier BA2 in front of it similar to that initially discussed for FIG. 1. This suffices for the reason that the narrow corridor H constrains carts 1 for movement towards the door DO2 in only one direction.

Although the invention has been described with reference to certain specific embodiments thereof, numerous modifications falling within the spirit and scope of the invention are possible.

I claim as my invention:

1. In combination, a cart having at least one cart-wheel on which the cart can be rolled, a confinement area having a substantially flat stationary floor, a boundary barrier for confining said cart to said area, said boundary barrier being interrupted to provide a passage permitting departure of persons from said area, and a threshold member for said passage acting to impede movement of said cart through said passage, said threshold member having a stationary base element and a plurality of projections projecting upwardly from said base element with their top surfaces substantially in the plane of the floor, said projections being spaced to expose a plurality of uniformly spaced parallel strips of equal width of said base element, said cart-wheel having a rim width less than the width of strips, whereby when said wheel-rim rolls from said area on to one of said strips the wheel-rim drops between pairs of said projections, said cart having a brake-shoe positioned when said cart is on said floor to clear the floor by a distance less than the height of said projections, said brake-shoe being positioned when said wheel-rim is between said projections to engage the upper surface of at least an adjacent one of said projections to restrain movement of said cart through the passage, said projections being formed by plural sets of grooves, each of said sets comprising a plurality of uniformly-spaced, straight, parallel grooves extending in a horizontal direction, the horizontal directions of said sets being angularly spaced from each other.

2. In combination, a cart having at least one cart-wheel on which the cart can be rolled, a confinement area having a susbtantially flat stationary floor, a boundary barrier for confining said cart to said area, said boundary barrier being interrupted to provide a passage permitting departure of persons from said area, and a plurality of adjacent threshold sections positioned successively in the path of persons moving from said area to said passage, each of said threshold sections having a stationary base element and a plurality of projections projecting upwardly from said base element with their top surfaces substantially in the plane of the floor, said projections being spaced to expose a plurality of uniformly spaced parallel strips of equal width of said base element, the strips of each of said threshold sections extending in a horizontal direction differing from that of the strips of the remainder of said threshold sections, said cart-wheel having a rim width less than the width of strips, whereby when said wheel-rim rolls from said area on to one of said strips the wheel-rim drops between pairs of said projections, said cart having a brake-shoe positioned when said cart is on said floor to clear the floor by a distance less than the height of said projections, said brake-shoe being positioned when said wheel rim is between said projections to engage the upper surface of at least an adjacent one of said projections to restrain movement of said cart through the passage.

References Cited by the Examiner

UNITED STATES PATENTS

| | | | |
|---|---|---|---|
| 107,989 | 10/1870 | Wilkes | 94—5 |
| 263,754 | 9/1882 | Bayer | 94—26 |
| 1,940,994 | 12/1933 | Callaghan | 94—1 |
| 2,964,140 | 12/1960 | Berezny. | |
| 3,146,872 | 9/1964 | Prucha | 198—16 |

SAMUEL F. COLEMAN, *Primary Examiner.*